Inventor
John Baude

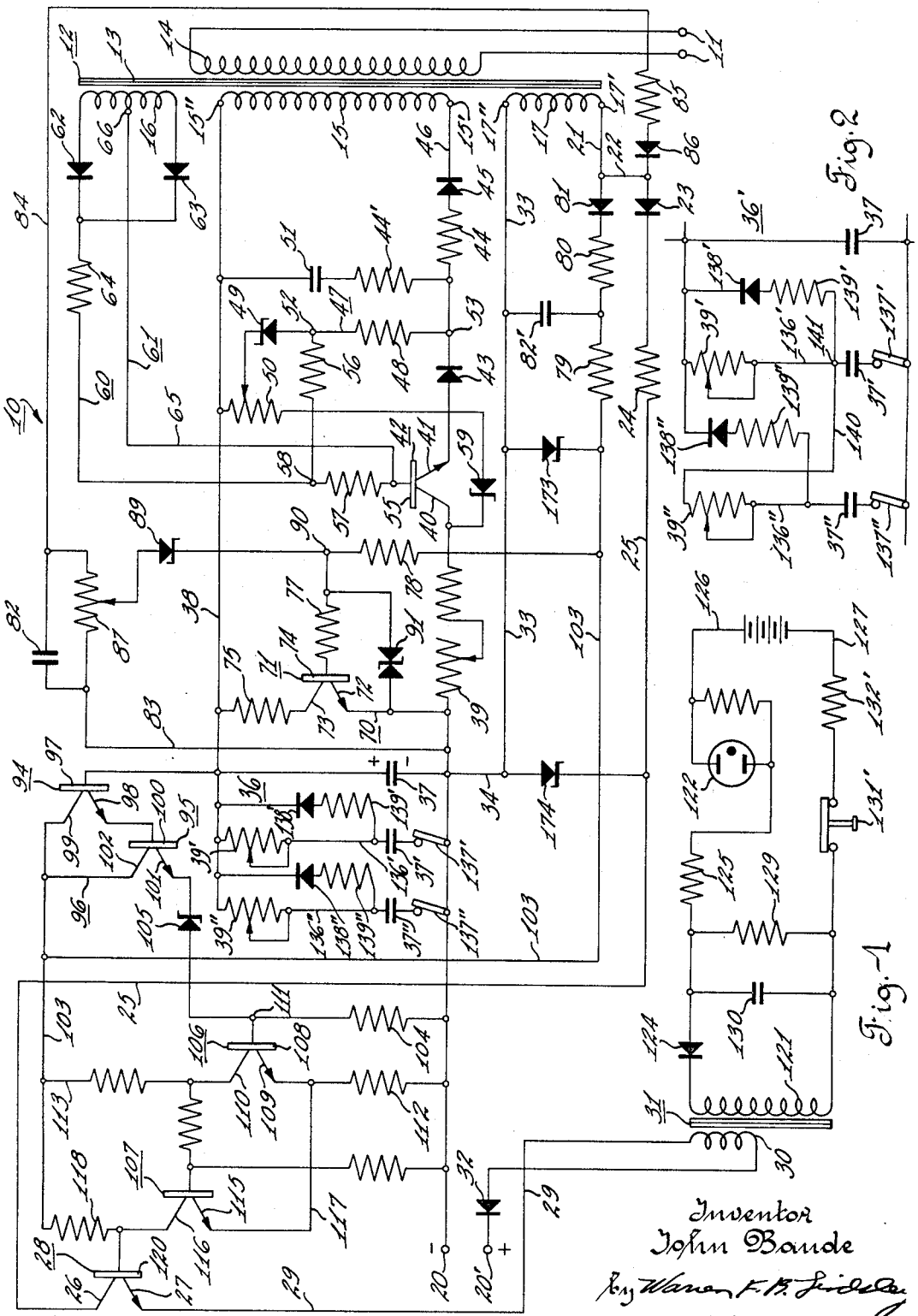

United States Patent Office 3,413,496
Patented Nov. 26, 1968

3,413,496
STATIC CONTROL CIRCUITS EMPLOYING RELAY
CHARACTERISTIC CURVE SHAPING MEANS
John Baude, Milwaukee, Wis., assignor to Allis-Chalmers
Manufacturing Company, Milwaukee, Wis.
Filed Jan. 5, 1961, Ser. No. 80,913
28 Claims. (Cl. 307—293)

This invention relates to protective relay systems and more particularly to a new system of protective relaying based upon the use of a plurality of electrical quantities integrated to form a registrating and regulating function.

For practically half a century induction disk type relays and relays of similar construction have provided the power engineer with the only reliable and relatively flexible tool for power line and distribution network protection. The rapidly growing semiconductor industry provides us today with equally powerful tools which when properly applied greatly improved the basic art of protective relaying.

In the new system disclosed and claimed static circuits are used throughout making possible the use of miniaturized components of high reliability which are not affected by vibration or mechanical shock or other adverse environmental conditions. In the claimed invention all sensing and time relay functions are performed at a low power level by static circuits. The control functions for effecting operation of, for example, a circuit breaker are performed by static bistable circuits or flip-flops at low power levels with the final output signals being amplified to a sufficiently high level to effect operation of the final control devices. A system is provided which operates almost entirely at a low power level, so that there is little heat to be dissipated and small, rugged, static components are utilized so that the system can be made small and compact. This new system is highly reliable since it does not depend on accurate calibration of devices involving moving parts and is compensated for temperature variations normally encountered in locations where protective relays are installed.

In accordance with the invention claimed a new and improved protective relay system is provided for controlling a power source comprising a static relay storage device for receiving electrical quantities from a power source and to emit a second electrical quantity. The storage device may comprise more than one parallelly arranged capacitive circuit. At least one of the circuits comprises a resistance capacitance storage unit of different time constant. At least two of the circuits operate in tandem to store electrical energy from the source. A sensing circuit or device is employed for passing to the storage device electrical quantities from a power source in the form of a continuous current flow or only voltage or current pulses of predetermined magnitude and duration. The storage device is charged at a rate depending upon the electrical volt-second quantity passed by the sensing device.

It is, therefore, one object of this invention to provide a new and improved relay system.

Another object of this invention is to provide a new and improved static relay system utilizing the registration and/or regulation of electrical quantities for controlling the operation of a plurality of electrical devices.

A further object of this invention is to provide a new and improved relay system in which a plurality of pulses of different electrical quantities are fed into static devices to provide a resultant force which controls an electrical device.

A still further object of this invention is to provide a new and improved relay system employing a multi-unit static storage device in which a number of the units operate in tandem to store electrical energy.

Objects and advantages other than those set forth will be apparent from the following description when read in connection with the accompanying drawing, in which:

FIG. 1 is a diagrammatic view of an improved protective relay system embodying the invention;

FIG. 2 illustrates a modification of the electrical energy storage device shown in FIG. 1;

Figure 3:
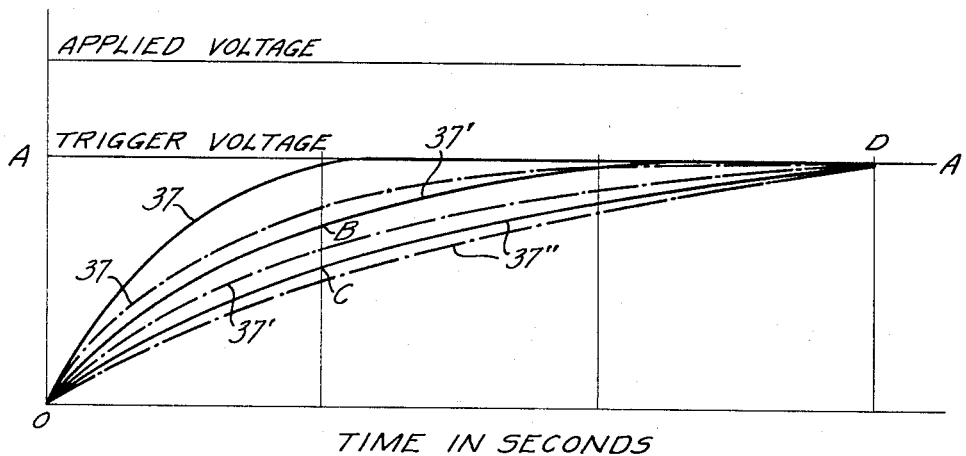
FIG. 3 illustrates graphically the operation of the individual units of the storage device with reference to their relative timing ability.

It will be apparent that the basic principles of the invention can be applied in various ways to perform the sensing and control functions required for different installations. However, in order to illustrate the invention, a typical embodiment has been shown in the drawing applied to the control and protection of a power source through the operation of a circuit breaker (not shown).

Referring more particularly to the drawing, FIG. 1 illustrates a protective relay system 10 which is utilized for sensing a variable electrical condition in a power source 11. Relay system 10 controls power source 11 through a transformer 12 which is electrically associated therewith. Transformer 12 comprises a core 13, at least one input or primary winding 14 directly connected across the power source 11 and a plurality of secondary windings for example windings 15, 16 and 17. If the power source 11 transmits, for example, a series of electrical pulses then the secondary windings associated with transformer 12 will transmit to the relay system 10 a plurality of signal pulses, the duration, amplitude and frequency of which depend upon the saturation condition of core 13 and these same conditions among other things of the primary power source.

Secondary windings 15, 16 and 17 of transformer 12 are connected to inverse time-voltage or inverse time-current circuits of the relay and employ transistor controlled pulse responsive electrical circuit elements with integrating inverse time-voltage or current characteristics. In order to make the unit suitable for protective relaying purposes, the characteristics of the relay must be extremely flexible. Its accuracy must be unaffected by temperatures normally encountered and excessive overload currents due to short circuits in the power circuit 11, and resulting voltage surges must be absorbed in such a manner that no damage results to the relay.

As shown in FIG. 1 a system is provided for the control and production of a signal applied to the output terminals 20, 20'. This applied signal to terminals 20, 20' is the output signal of secondary winding 17 of transformer 12 fed from terminal 17' of winding 17 through conductor 21, conductor 22, diode 23, resistor 24, conductor 25, collector 26 and emitter 27 of the normally nonconductive transistor 28, conductor 29, primary winding 30 of transformer 31, diode 32 to terminal 20', and from terminal 17" of winding 17 through conductors 33, 34 and 35 to terminal 20.

Transistor 28 controlling the applied signal pulse to terminals 20, 20' is in turn controlled by the integrated effects of the electrical energy such as, for example, pulses received from secondary windings 15, 16 and 17 of transformer 12.

The output signals of secondary windings 15, 16 and 17 are used to control the energization of transistor 28. Electrical energy emitted by winding 15 charges capacitor 51 and above a certain predetermined energy level also the static energy storage device 36 comprising capacitor 37 and at least one additional resistance, capacitance circuit in parallel with capacitor 37. As shown in FIG. 1 two resistance, capacitance circuits 136' and 136" in parallel with capacitor 37 are used and comprise capacitors 37′, 37″ charging resistors 39′, 39″ and switches 137′, 137″, respectively. Each of the charging resistors 39′ and 39″ are shunted by discharge diodes 138′ and 138″ and resistors 139′ and 139″. Resistors 139′ and 139″ may be omitted if so desired, in order to decrease to a minimum the discharge time of capacitors 37′ and 37″. Capacitors 37, 37′ and 37″ may be directly connected to terminal 15″ of secondary winding 15 through a conductor 38 and to terminal 15′ of secondary winding 15 through an adjustable resistor 39.

The circuit in this form, namely where capacitors 37, 37′ and 37″ are directly connected to winding 15 through conductor 38 and adjustable resistor 39, have a fixed time constant which is independent of the electrical condition of the source. The time constant can be varied depending upon the selected resistance values of the adjustable resistors 39, 39′ and 39″ and capacitors 51, 37, 37′ and 37″. For certain types of relatively high speed relays such circuits will furnish the desired results. For most cases a variable time constant is required. This means that in order to have control over the inverse time-current characteristics of the relay, the time constant of the circuit must be a function of the energy level of the source connected to the primary winding 14 of transformer 12, and/or in addition to this must be a function of a predetermined single or multiple relay control requirement. In order to provide such flexibility at least one semiconductor switch such as, for example, a transistor 42 and control circuits are connected in series with resistor 39 in the manner shown in FIG. 1. It will become apparent that additional transistors connected in series with each other can be used to perform multiple control functions based upon receipt of a plurality of separate signals. It is also conceivable that such additional transistors may be connected in parallel with each other in which case each transistor controls independently from the other the rate at which the electrical charge is transferred to capacitors 37, 37′ and 37″.

In the following description of FIG. 1 only one normally nonconducting semiconductor such as transistor 42 comprising a collector 40 and a base 55 is used. Collector 40 and emitter 41 are connected in series with a diode 43, resistor 44, diode 45, and conductor 46 to terminal 15′ of winding 15 and through resistor 39 to one side of capacitors 37, 37′ and 37″. Upon capacitors 37, 37′ and 37″ receiving a predetermined electrical charge a complex mono-bistable electrical or electro-mechanical or electro-magnetic or electro-chemical device is triggered into a state of conduction which renders transistor 28 conductive to pass energy such as pulses from secondary winding 17 of transformer 12 to terminals 20, 20′. The absorbed energy in capacitors 37, 37′ and 37″ merely provides the required inverse time energy functions before triggering action is accomplished.

Transistor 42 is normally biased to cut off, but is rendered conductive upon the pulses transmitted from secondary winding 15 reaching a predetermined level. The predetermined level is established as the full load operating point of the relay. Transformer 12 transmits electrical energy up to a predetermined level without charging capacitors 37, 37′ and 37″ because transistor 42 is retained biased in its nonconductive state. In order to determine the point of conduction of transistor 42 a shunting or sensing device or circuit 47 is arranged across the secondary winding 15 of transformer 12 and comprises a resistor 48, a Zener diode 49 and a potentiometer 50. Shunting capacitor 51 is shown across secondary winding 15 and in series with resistor 44, and diode 45 for stabilizing purposes. Capacitor 51 is optional and may be eliminated for ultrafast operating relays or may be connected in series with a suitable resistor 44′, as shown. Diode 45 and resistor 44 connected in series with secondary winding 15, as shown in FIG. 1, charge capacitor 51 on each electrical pulse of proper polarity applied to primary winding 14 of transformer 12. Zener diode 49 starts to breakdown at the instant the voltage across it reaches a predetermined value at which time it starts to pass current. When Zener diode 49 passes current, a voltage will appear across resistors 48 which renders point 52 in circuit 47 positive with respect to point 53.

Point 52 is interconnected with a base 55 of transistor 42 through resistors 56 and 57. Making point 52 positive with respect to a point 53 puts or impresses a positive potential on base 55 of transistor 42 and renders it conductive. When Zener diode is nonconductive only transistor leakage current flows through circuit 47 and the base 55 of transistor 42 is biased negative with respect to emitter 41 rendering transistor 42 nonconductive. In the nonconductive state of Zener diode 49 only the voltage drop of approximately .6 volt appears across diode 43. When Zener diode 49 conducts current, transistor 42 is rendered conductive and passes current through its emitter collector circuit to storage device 36. The potential applied to base 55 of transistor 42 upon the conduction of Zener diode 49 is known as bias. This bias is a differential potential between the potential drop built up across resistor 48 upon the conduction of Zener diode 49 and the .6 volt drop across the diode 43. In order to limit the possible voltage drop across transistor 42 at cutoff to a predetermined value a Zener diode 59 is applied in shunting arrangement across its emitter and collector elements.

In order to provide additional means for controlling the transfer of energy by means of transistor 42, voltages of varying polarity, phase angle and frequency may be applied to points 55 and 58 and across resistor 57 either continually or periodically for aiding or restraining the effect of the DC bias as provided by action of Zener diode 49. Zener diode 49 may also be replaced by a suitable passive or active circuit element, such as an external switch, or a second DC or AC power source. In this manner a plurality of functions can be integrated by action of storage device 36 in any desired mode or fashion.

The transfer characteristics of electrical energy stored in capacitor 51 to storage device 36 by means of transistor 42 is further influenced by predetermined selection of the individual time constants of the three parallelly connected resistance, capacitance circuits formed by capacitor 37 and resistor 39 and parallelly arranged circuits 136′ and 136″. Depending upon the rate of energy transfer, voltage across the terminals of capacitor 37 will always be nearer the critical predetermined trigger level of the later described flip-flop circuit controlling transistor 28 than voltages built up in the individual and parallelly connected circuits 136′ and 136″ and their capacitors 37′ and 37″, respectively. In this manner and under conditions of long time relay operation the full combined capacity of capacitors 37, 37′ and 37″ is being utilized, while at a high rate of electrical energy transfer from capacitor 51 to storage device 36, capacitor 37 will reach the predetermined discharge or trigger level correspondingly or proportionally sooner than the resistance, capacitance circuits 136′ and 136″ attached to it and fed from it. The tandem connection of the multiunit storage circuits of storage device 36 provides a flexible means to shape the response time curve of the relay at predetermined electrical energy levels by providing a flexible storage system with a combined time constant which is a function of the supplied electrical energy level. Switches 137′ and 137″ provide a means for selective operation of the individual storage circuits 136′ and 136″ which further increases the scope of relaying flexibility.

In order to restrict the amount of energy transferred to storage device 36 a restraining signal in addition to the DC bias is applied to base 55 of transistor 42 from secondary winding 16 of transformer 12 through circuits 60 and 61. Circuit 60 comprises a pair of diodes 62 and 63 connected at one point to each other and each to different terminal ends of secondary winding 16 and at said one point further connected in series with a pair of serially connected fixed or variable resistors 64 and 57. Circuit 61 comprises a conductor 65 connected at one end to the base 55 of transistor 42 and at the other end to the center tap 66 of secondary winding 16 of transformer 12. The voltage pulses from winding 16 are applied across resistor 57 and in combination with the signal from Zener diode 49 render transistor 42 periodically conductive. By rendering transistor 42 conductive causes the emitter collector circuit of transistor 42 to conduct current. The restraining signal from winding 16 of transformer 12 renders transistor 42 conductive for only a part of a cycle so that the time duration of current conduction, for example, the width and amplitude of the current cycle passed by transistor 42 may be controlled. By varying the position of potentiometer 50 and resistance of resistor 64 the inverse time current characteristics of the relay may be varied. The resultant voltage V applied to base 55 of transistor 42 may be expressed by the following equation $$Vz - Vd - Vac = Vt$$

wherein Vz is the voltage drop caused by the Zener diode across resistor 48, Vd is the .6 volt drop across diode 43, Vac is the instantaneous voltage drop across resistor 57 from the signal source of winding 16 and Vt is the resultant base to emitter control voltage on transistor 42.

As noted from FIG. 1 of the drawing the emitter and collector of transistor 42 are connected in series with the winding 15 of transformer 12, and when transistor 42 is biased for cutoff no charge is placed on storage device 36. Because transistor 42 might pass a slight amount of current at high temperatures due to leakage current causing a charge to build up on storage device 36 and eventually tripping the flip-flop circuits controlling transistor 28, another sensing circuit such as short circuit 70 is provided across capacitor 37. Short circuit 70 comprises a transistor 71 having an emitter 72, collector 73 and base 74. The emitter 72 and collector 73 are connected in series with a resistor 75 in shunt connection across capacitor 37, as shown. Transistor 71 is purposely kept conductive with the circuitry connected to its base 74 when transistor 42 is rendered nonconductive. Transistor 71 is rendered conductive upon a capacitor 82' being charged and by being connected to terminal 17' of winding 17 of transformer 12 through resistors 77, 78, 79, 80 and diode 81. Transistor 71 is rendered nonconductive upon a capacitor 82 being charged to a predetermined value. Capacitor 82 is connected through conductors 83, 34 and 33, to terminal 17" of secondary winding 17 of transformer 12 and through a conductor 84, resistor 85, diode 86 and conductors 22 and 21 to terminal 17' of secondary winding 17 of transformer 12.

A potentiometer 87 is connected in shunting arrangement across capacitor 82 with one terminal thereof connected through a Zener diode 89 to a point 90 between the series connection of resistors 77 and 78. When the potential across capacitor 82 reaches a predetermined value, Zener diode 89 breaks down and starts to conduct current. When Zener diode 89 starts to conduct, the potential on base 74 of transistor 71 is changed from positive to negative with respect to its emitter 72 and the transistor 71 ceases to pass current through its emitter collector circuit. When transistor 71 becomes nonconductive the shunt circuit across capacitor 37 comprising the emitter collector circuit of transistor 71 is interrupted. A charge then builds up across capacitor 37, which is part of the storage device 36, upon the conduction of the emitter collector circuit of transistor 42. A double anode Zener diode 91 is connected in shunting arrangement across the emitter 72 and base 74 of transistor 71 and resistor 77 to protect the transistor against abnormally high voltage pulses which would destroy it.

As noted from the above, the controls of transistors 42 and 71 require coordination to start charging storage device 36 when a predetermined voltage level has been reached by secondary winding 15. Thus, transistor 71 may be intermittently rendered nonconductive substantially simultaneously at the time transistor 42 is rendered conductive. When the voltage level of the electrical energy transmitted by secondary winding 15 is reduced to a predetermined value below the breakdown level of Zener diode 49, shunting circuit 47 is deenergized and no longer conducts current and the potential on base 55 of transistor 42 is made less positive or rendered negative causing transistor 42 to become nonconductive. When transistor 42 becomes nonconductive, transistor 71 is rendered conductive. Transistor 71 is intermittently rendered conductive by the voltage of the pulses from secondary winding 17 being reduced proportionally with the reduction of the voltage level of pulses from secondary winding 15 causing Zener diode 89 to be rendered nonconductive. The lack of current flow through Zener diode 89 causes the potential applied to base 74 of transistor 71 to become more positive and transistor 71 to become conductive. As soon as transistor 71 becomes conductive, storage device 36 is discharged. Capacitor 37 is discharged practically instantaneously while the individual storage circuits 136' and 136" discharging through diodes 138' and 138" and resistors 139' and 139" allow capacitors 37' and 37" to discharge simultaneously with capacitor 37 into the short circuit formed by transistor 71 and resistor 75 across the terminals of capacitor 37. Introduction of resistors 39' and 39" in series with the discharge diodes 138' and 138" permits control in a predetermined manner over the rate of discharge or "reset" time of the relay circuit.

An inductance or a time relay device also may be used for a storage device. This invention is directed not merely to the use of a capacitor as a storage device, but among other things, to the method of charging the capacitor and its control by and with other static devices.

In order to increase the input impedance to the static flip-flop circuit controlling transistor switch 28 to refrain from unduly reducing the charge on storage device 36, a pair of transistors 94 and 95 are used in a sensing circuit 96 provided for either continuously or sequentially checking the charge on this storage capacitor. In the structure shown in FIG. 1 the sensing circuit is continuously sampling the charge on storage device 36. Transistor 94 comprises a base 97, emitter 98 and collector 99. Transistor 95 comprises a base 100, emitter 101 and collector 102. Base 97 of transistor 94 is connected to the positive terminal of capacitor 37 and the emitter 98 is connected to the base 100 of transistor 95. The collectors 99 and 102 of transistors 94 and 95, respectively, are connected through conductor 103, resistors 79 and 80, diode 81 and conductor 21 to terminal 17' of secondary winding 17 of transformer 12.

When capacitor 37 is charged to a predetermined voltage the positive charge is placed on base 97 of transistor 94. The emitter 98 of transistor 94 and the emitter 101 of transistor 95 assume essentially a potential slightly more positive than that of conductor 35 when capacitor 37 is in the state of discharge because of the leakage current flowing from wire 103 through collector 99 and emitter 98 of transistors 94 and collector 102 and emitter 101 of transistor 95, through Zener diode 105 and resistor 104 to conductor 35. The voltage which appears between conductors 35 and 103 is limited by Zener diode 173.

Transistors 94 and 95 are connected in a type of connection known as "compound-emitter-follower." The emitter potential will be slightly more negative than the base potentials of the respective transistors 94 and 95. Thus, if voltages rising on the capacitor 37 exceed the breakdown voltage of the Zener diode 105, emitters 101 and 98 are held at a potential determined by the voltage drop across resistor 104 and Zener diode 105. As the charge on the capacitor 37 continues to rise, bases 100 and 97 of transistors 95 and 94 will become more positive than the respective emitters 101 and 98 and current will now flow from terminal 17' of winding 17 through conductor 21, diode 81, resistor 80, resistor 79, conductor 103, collector 99 and emitter 98 and collector 102 and emitter 101 of transistors 95 and 94, respectively, and through Zener diode 105, resistor 104, conductors 35, 34 and 33 to terminal 17" of winding 17.

Under this operating condition base current of transistors 94 and 95 is flowing from terminal 15" of winding 15 through conductor 38, base 97 and emitter 98 of transistor 94, base 100 and emitter 101 of transistor 95, Zener diode 105, resistor 104, conductor 35, resistor 39, collector 40, emitter 41 of transistor 42, diode 43, resistor 44, diode 45, conductor 46 and terminal 15' of winding 15. During the period of conduction the charge on capacitor 37 will contribute considerably to the base current flow.

The conduction of transistor 95 through its emitter collector circuit actuates the switch or flip-flop circuit comprising transistors 106 and 107. Transistor 106 comprises a base 108, emitter 109 and a collector 110. Base 108 is connected at point 111 between resistor 104 and diode 105 in series circuit between conductors 103 and 35 in the emitter collector circuit of transistor 95. The flow of current through the latter circuit including the emitter and collector of transistor 94 applies a positive potential with reference to emitter 109 to base 108 of transistor 106 and renders it conductive. Current then flows from conductor 103 through conductor 113, collector 110, emitter 109 of transistor 106 and resistor 112 to conductor 35.

In the usual manner for flip-flop circuits of the type shown in the circuits for transistors 106 and 107 upon the flow of current through the emitter collector circuit of transistor 106 the base of transistor 107 is rendered negative with respect to its emitter 115 and current flows from conductor 103 (considered positive in polarity) through resistor 118, collector 116, emitter 115, conductor 117, resistor 112 to conductor 35 (considered negative in polarity). The discontinued flow of current through the emitter collector circuit of transistor 107 renders the base 120 of transistor 28 positive thereby rendering transistor 28 conductive. Transistor 28 then passes half wave AC current pulses from winding 17 through conductors 21, 22, diode 23, resistor 24, conductor 25, collector 26, emitter 27, conductor 29, primary winding 30 of transformer 31, diode 32 to the positive terminal 20' of the relay output signal terminals 20, 20'. The amplitude of the half wave signal passed by transistor 28 is limited by Zener diode 174.

The secondary winding 121 of transformer 31 is connected across a diode 124 in series with a capacitor 130. The electrical pulses which are emitted by winding 121 when transistor 28 passes intermittently current through winding 30 are stored in capacitor 130. This voltage is added to the voltages existing between conductors 126 and 127 and triggers the neon light 122 into conduction. Current then flows from conductor 127 through resistor 132' normally closed push button 131', resistor 129 and resistor 125 to conductor 126 until push button 131 is operated interrupting the current flow causing the neon light to extinguish itself.

In accordance with the operation of the relay system illustrated in FIG. 1, pulses either constant or variable are fed into transformer 12. Secondary windings 15, 16 and 17 responsive to those pulses energize their respective circuits. Pulses or parts thereof from secondary winding 15 above a given voltage value are fed to storage device 36. Transistor 42 provides a switching function in the circuit utilized to charge storage device 36 from secondary winding 15. Transistor 42 operating as a switching device becomes conductive upon the transmission by secondary winding 15 of pulses above a predetermined voltage rating. When pulses of a predetermined voltage rating are transmitted by secondary winding 15, Zener diode 49 in the shunting circuit 47 breaks down and conducts current. The conduction of current by shunting circuit 47 biases transistor 42 in the conductive direction. The bias potential applied to base 55 of transistor 42 is the resultant affect of three different and variable voltage values or signals as heretofore explained. Secondary winding 16 provides biasing, fully rectified pulses which in combination with the biasing affect of diode 43 limits the portions of or pulses passed by transistor 42 when rendered conductive. Transistor 42 when conductive passes discrete amounts of electric energy such as portions of parts or all of the pulses emitted by secondary winding 15 to storage device 36.

Storage device 36 in the manner above described upon reaching a predetermined charge triggers the sensing circuit comprising the interconnected transistors 94 and 95. Upon energization of transistors 94 and 95 the flip-flop circuit comprising transistors 106 and 107 is energized thereby rendering transistor 28 conductive. Upon the conduction of transistor 28 pulses are passed from secondary winding 17 through transistor 28 and the annunciation device comprising transformer 31 to the output terminals 20, 20'. The annunciation device is triggered upon the energization of transformer 31 to illuminate the neon lamp 122 or provide an audible sound by means of suitable devices.

The new static relays disclosed have an outstanding advantage over the present induction type relays insofar as the static relays incorporate features which render them capable of resetting practically instantaneously. Spurious relay operation has often been blamed in the past for unexpected shutdown of parts of a distribution network as a result of switching operations or short circuits in other parts of the network. Coordination of induction type relays is difficult to accomplish because of the inertia of the rotating discs and because of the relatively long time it takes for the discs to return to their reset positions. In other words, if an overload condition develops in one part of the system, more than one overcurrent relay disc usually starts to move in the direction for closing pairs of cooperating contacts. One of these relays usually will close its cooperating contacts first and the resulting redistribution of the electrical load on the system will cause another relay to operate prematurely because it already has traveled in the direction of contact closure under the influence of previous overcurrent conditions.

Since there are no moving parts in the new and improved static relays disclosed there is no inertia. This enables the new static relays to adjust themselves relatively instantaneously to prevailing load distribution. Their resetting speed can be controlled if so desired, by suitable selection of discharge resistors 75, 139' and 139".

FIG. 2 illustrates a modification of the storage device 36 shown in FIG. 1 wherein like parts are provided with similar reference characters. Storage unit 136" of storage device 36' is connected by conductor 140 to point 141 arranged between capacitor 37' and charging resistor 39' of storage unit 136'. In this manner storage unit 136" receives its charge from capacitor 37' and not from capacitor 37 as in FIG. 1. This arrangement further expands the timing range of the relay circuit with respect to the applied electrical energy levels of the source 11.

FIG. 3 illustrates in full line curves the relative charging time of the three separate storage units comprising capacitors 37, 37' and 37". It is shown that for voltages applied to the storage system exceeding appreciably the trigger voltage of the storage system capacitor 37 will build up its voltage faster than the voltage being built up across capacitors 37' and 37", thereby reaching its trigger voltage level illustrated by line A—A in FIG. 3 much sooner than the storage units comprising capacitors 37' and 37". These storage units will reach voltage levels indicated by point B for capacitors 37' and point C for capacitor 37" which are much lower than the trigger voltage level. The broken line curves of FIG. 3 illustrate that when the applied voltage to the relay is only slightly higher than the trigger voltage which is the case when the relay operates on a long time bases all three storage units reach the trigger level voltage at point D almost simultaneously.

Figure 4:
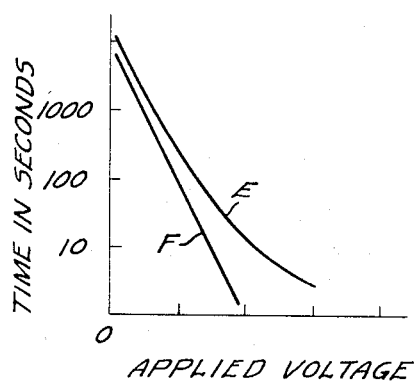
FIG. 4 illustrates graphically the influence of the multi-unit storage device upon the characteristic relay time curve as compared with the characteristic relay time curve of a single capacitor storage device.

In FIG. 4 with reference to time and applied voltage, curve E shows the relay performance which is obtained with a single capacitor storage device while curve F illustrates the corrective influence attainable by use of the multiunit storage device shown in FIGS. 1 and 2.

Although many variations of capacitance, resistance electrical energy storage circuits may be used one possible selection might include capacitor 37″ as being 200 microfarads, capacitor 37′ as being 100 microfarads, capacitor 37 as being 20 microfarads with resistor 39″ being 20,000 ohms and resistor 39′ being 100,000 ohms.

If capacitors 37, 37′ and 37″ have been charged to the point where the relay almost operates but before such operation is obtained, the overcurrent is reduced from a very high value to a moderately low value, capacitor 37 discharges its energy into the larger capacitors 37′ and 37″ and diodes 138′ and 138″ function to discharge capacitors 37′ and 37″ to the lowest average value of voltage on all three capacitors. In this manner considerable additional relaying operating time is obtained because now all three capacitors again have to be recharged from a relatively low value of voltage build up. In case the overcurrent condition sensed by the relay should disappear completely transistor 71 is rendered conductive as heretofore described and capacitors 37′ and 37″ discharge through diodes 138′, 138″ directly into the circuit formed by resistor 75 and transistor 71 together with capacitor 37. In this manner a complete reset is obtained because resistors 39′ and 39″ are bypassed by the discharge diodes 138′ and 138″. The rate of discharge can be slowed by introducing resistors 139′ and 139″. With these resistors, the rate of discharge of capacitors 37 is determined by the value of resistor 139″ and the rate of discharge of capacitor 37′ is determined by resistor 139′. If resistor 75 is made sufficiently high as appreciably lengthening of the reset action can be obtained if this is desired for coordination of the static relay with the present induction type relays.

Although but a few embodiments of the present invention have been illustrated and described, it will be apparent to those skilled in the art that various changes and modifications may be made therein without departing from the spirit of invention or from the scope of the appended claims.

Having now particularly described and ascertained the nature of my said invention and the manner in which it is to be performed, I declare that what I claim is:

1. An electric circuit comprising a source of electrical pulses, an electrical pulse storage device, a transistor switching means for connecting said source of pulses to said storage device, an interruptable shunting means connected across said storage device, means for triggering said switching means into conduction and interrupting said shunting means comprising a sensing device connected across said source of pulses for passing current only upon said pulses exceeding a predetermined voltage, said sensing device upon conduction triggering said switching means to connect said source of pulses to said storage device and interrupting said shunting means across said storage device causing said storage device to assume an electrical charge, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said sensing device, and means for discharging said storage units at predetermined voltage levels.

2. An electric circuit comprising a source of electrical pulses, an electrical pulse storage device, a transistor switching means for intermittently connecting said source of pulses to said storage device, said switching means being rendered nonconductive, means for imposing on said switching means a first signal to electrically bias said switching means toward conduction, and means for superimposing on said switching means a second signal, said switching means upon receiving said second signal passing pulses to said storage device, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said switching means.

3. An electric circuit comprising a source of electrical pulses, an electrical pulse storage device, a transistor for intermittently connecting said source of pulses to said storage device, said transistor being rendered nonconductive, means for imposing on said transistor a first variable pulse signal to electrically bias said transistor, and means for superimposing on said transistor a second variable pulse signal, said transistor upon receiving a predetermined second signal passing pulses to said storage device, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said transistor, said first and second signals varying in accordance with the magnitude of pulses from said source.

4. An electric circuit comprising a source of electrical pulses, an electrical pulse storage device, a transistor switching means for intermittently connecting said source of pulses to said storage device, a transistor for intermittently shunting said storage device, means for triggering said switching means into conduction comprising a sensing circuit connected across said source of pulses for passing current only upon said pulses exceeding a predetermined voltage, said sensing circuit upon conduction triggering said switching means to connect said source of pulses to said storage device, means responsive to said pulses exceeding a predetermined voltage for triggering said transistor for interrupting said shunting means across said storage device causing said storage device to assume an electrical charge, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said sensing device, and means for discharging said storage units at predetermined voltage levels.

5. An electric circuit comprising a source of electrical pulses, an electrical pulse storage device, a transistor switching means for connecting said source of pulses to said storage device, a transistor for shunting said storage device, and means for triggering said switching means into conduction comprising a sensing circut, said sensing circuit being energized upon said pulses exceeding a predetermined voltage, said sensing circuit upon energization triggering said switching means into conduction to connect said source of pulses to said storage device, means responsive to said pulses exceeding a predetermined voltage for rendering the shunting effect of said transistor ineffective causing said storage device to assume an electrical charge, said storage device comprising more than one parallelly arranged capacitive circuit, at least one of said circuits comprising a resistance, capacitance storage unit of different time constant, at least two of said circuits operating in tanden to store electrical energy from said source, said storage device being charged at a rate depending on the volt second characteristics of said pulses passed by said sensing device.

6. An electric circuit comprising a source of electrical pulses, an electrical pulse storage device, a transistor switching means for connecting said source of pulses to said storage device, a transistor for shunting said storage device, and means for triggering said switching means into conduction comprising a sensing circuit, said sensing circuit being energized upon said pulses exceeding a predetermined voltage, said sensing circuit upon energization triggering said switching means into conduction to connect said source of pulses to said storage device, sensing means responsive to said pulses exceeding a predetermined voltage for rendering the shunting effect of said transistor ineffective causing said storage device to assume an electrical charge, said storage device comprising more than one parallelly arranged capacitive circuit, at least one of said circuits comprising a resistance, capacitance storage unit of different time constant, at least two of said circuits operating in tandem to store electrical energy from said source, said storage-device being charged at a rate depending on the volt second characteristics of said pulses passed by said sensing device, said transistor upon deenergization of the sensing means being rendered conductive to shunt and discharge said storage device.

7. An electric circuit comprising a source of electrical pulses, an electrical pulse storage device, a transistor switching means for intermittently connecting said source of pulses to said storage device, said switching means being biased into nonconduction, a transistor for intermittently shunting said storage device, said transistor being biased into conduction, means for triggering said switching means into conduction comprising a sensing circuit connected across said source of pulses for passing current only upon said pulses exceeding a predetermined voltage, said sensing circuit upon conduction triggering said switching means to conduction to connect said source of pulses to said storage device, means responsive to said pulses exceeding a predetermined voltage for triggering said transistor for rendering it nonconductive to interrupt its shunting function across said storage device causing said storage device to assume an electrical charge, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said sensing device, and means for discharging said storage units at predetermined voltage levels.

8. An electric circuit comprising a source of electrical pulses, an electrical pulse storage device, a transistor switching means for intermittently connecting said source of pulses to said storage device, means for electrically biasing said switching means into nonconduction, a transistor for intermittently shunting said storage device, means for electrically biasing said transistor into conduction for discharging said storage device, and means for triggering said switching means into conduction comprising a sensing circuit connected across said source of pulses for passing current only upon said pulses exceeding a predetermined voltage, said sensing circuit upon conduction electrically biasing said switching means into conduction to connect said source of pulses to said storage device, sensing means responsive to said pulses exceeding a predetermined voltage for electrically biasing said transistor for rendering it nonconductive to interrupt its shunting function across said storage device causing said storage device to assume an electrical charge, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said sensing circuit, said transistor upon deenergization of said sensing means being rendered conductive by said biasing means to substantially immediately shunt and discharge said storage device.

9. An electric circuit comprising a source of electrical pulses, an electrical pulse storage device, means for connecting said source of pulses to said storage device, said connecting means comprising a first sensing device for passing to said storage device only pulses exceeding a predetermined voltage, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said first sensing device, switching means, a second sensing device connected to said storage device, and a static switch controlled by said second sensing circuit for actuating said switching means upon a predetermined condition of said storage device.

10. An electric circuit comprising a source of electrical pulses, an electrical pulse storage device, means for connecting said source of pulses to said storage device, said connecting means comprising a first sensing device for passing to said storage device only pulses exceeding a predetermined voltage, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said first sensing device, switching means, a second sensing device connected to said storage device, and a static flip-flop circuit controlled by said second sensing circuit for actuating said switching means upon a predetermined condition of said storage device.

11. An electric circuit comprising a source of electrical pulses, an electrical pulse storage device, a transistor for intermittently connecting said source of pulses to said storage device, said transistor being rendered nonconductive, means for imposing on said transistor a first signal to electrically bias said transistor toward conduction, and means for superimposing on said transistor a second signal, said transistor upon receiving said second signal passing pulses to said storage device, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said transistor, a switching means, a sensing device connected to said storage device, and a static flip-flop circuit controlled by said sensing circuit for actuating said switching means upon a predetermined condition of said storage device.

12. An electric circuit comprising a source of electrical pulses, a transformer comprising a primary winding, a first secondary winding and a second secondary winding, said primary winding being connected across said source of pulses, an electrical pulse storage device, a semiconductor switch, means for connecting said switch to said first winding and to said pulse storage device, means for rendering said switch nonconductive, means for imposing on said switch a signal from said first winding for electrically biasing said switch to conduction, said switch upon receiving said signal passing pulses from said first winding to said storage device, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said switch, a switching means for connecting a load to said second winding, a sensing device connected to said storage device, and a flip-flop circuit controlled by said sensing circuit for actuating said switching means to connect said second winding to said load upon a predetermined condition of said storage device.

13. An electric circuit comprising a source of electric pulses, a pulsing transformer comprising a primary winding, a first secondary winding, a second secondary winding and a third secondary winding, said primary winding being connected across said source of pulses, an electric pulse storage device, a transistor switch, means for connecting said switch to said first winding and to said pulse storage device, means for rendering said switch nonconductive, means for imposing on said transistor a first signal from said second winding to electrically bias said transistor switch toward conduction, means for imposing upon said switch a second direct current signal for rendering said switch conductive, said switch upon receiving said second direct current signal passing pulses from said first winding to said storage device, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said switch, a switching means for connecting a load to said third winding, a sensing device connected to said storage device, and a flip-flop circuit controlled by said sensing circuit for actuating said switching means to connect said third winding to said load upon a predetermined condition of said storage device.

14. An electric circuit comprising a source of electric pulses, a pulsing transformer comprising a primary winding, a first secondary winding and a second secondary winding, said primary winding being connected across said source of pulses, an electric pulse storage device, a transistor switch, means for connecting said switch to said first winding and to said pulse storage device, means for rendering said switch nonconductive, means for imposing on said switch a signal from said first winding to electrically bias said switch to conduction, said means comprising a first sensing circuit connected across said source of pulses for passing current only upon said pulses exceeding a predetermined voltage, said first sensing circuit upon conduction electrically biasing said switch to conduction causing said switch to pass pulses to said storage device, said storage device comprising more than one parallelly arranged capacitive circuit, at least one of said circuits comprising a resistance, capacitance storage unit of different time constant, at least two of said circuits operating in tandem to store electrical energy from said source, said storage device being charged at a rate depending on the volt second characteristics of said pulses passed by said switch, a switching means for connecting a load to said second winding, a second sensing device connected to said storage device, a flip-flop circuit controlled by said second sensing circuit for actuating switching means to connect said second winding to said load upon a predetermined condition of said storage device, and an indicating device connected across said load and energized upon connection of said second winding to said load.

15. An electric circuit for producing an output between two output terminals varying as a function of the level of a source of electrical energy, said electric circuit comprising a first series connected resistance-capacitance circuit connected across the source; a second series connected resistance-capacitance circuit connected across the capacitance of the first series circuit; and one of said output terminals connected to the side of the second series circuit connected between the resistance and capacitance of the first series circuit and the other of said output terminals connected to the other side of the second series circuit.

16. An electric circuit for producing an output between two output terminals varying as a function of the level of a source of electrical energy, said electric circuit comprising an electrical energy storage device for storing electrical energy received from the source, said storage device comprising two parallelly connected circuits connected in series with a resistance across the source, and one of said parallelly connected circuits comprising a capacitance storage unit and the other comprising a series connected resistance-capacitance storage unit; and one of said output terminals connected to one side of said parallelly connected circuits and the other of said output terminals connected to the other side of said parallelly connected circuits.

17. An electric circuit for producing an output between two output terminals varying as a function of the level of a source of electrical energy, said electric circuit comprising an electrical energy storage device for storing electrical energy received from the source, said storage device comprising a plurality of parallelly connected circuits connected in series with a resistance across the source with said output produced across said parallelly connected circuits, one of said parallelly connected circuits comprising a capacitance storage unit, and each of said other parallelly connected circuits comprising a resistance-capacitance storage unit with each of said storage units having a different time constant; and one of said output terminals connected to one side of said parallelly connected circuits and the other of said output terminals connected to the other side of said parallelly connected circuits.

18. An electric circuit for producing an output varying as a function of the duration and level of a source of electrical energy, said circuit comprising a resistance connected in series with two parallelly connected capacitance circuits across the source, each of said parallelly connected circuits having a different time constant, and one of said parallelly connected circuits comprising a capacitance storage unit and the other comprising a series connected resistance-capacitance storage unit with said output produced across the parallelly connected circuits; and means for simultaneously totally discharging all the storage units at a predetermined level of the source less than a predetermined level.

19. An electric circuit comprising:
  a source of electrical energy;
  an electrical energy storage device for storing electrical energy received from the source, said storage device comprising more than one parallelly connected capacitance circuit and a resistance connected in series with said parallelly connected circuits, at least one of said parallelly connected circuits comprising a series connected resistance-capacitance storage unit, each of said parallelly connected circuits having a different time constant;
  means for connecting said source of energy to said storage device, said means for connecting comprising a sensing device for passing to the storage device only energy exceeding a predetermined level; and two output terminals with one of said output terminals connected to one side of said parallelly connected circuits and the other of said output terminals connected to the other side of said parallelly connected circuits.

20. An electric circuit comprising:
a source of electrical energy;
an electrical energy storage device for storing electrical energy received from the source, said storage device comprising a resistance and a plurality of parallelly connected capacitive circuits connected in series across the source, and at least one of said parallelly connected circuits comprising a series connected resistance-capacitance storage unit;
means for connecting said source of energy to said storage device, said means for connecting comprising a sensing device for passing to said storage device only energy exceeding a predetermined level whereby said storage device stores electrical energy at a rate varying as a function of the duration and level of said energy passed by said sensing device; and
two output terminals with one of said output terminals connected to one side of said parallelly connected circuits and the other of said output terminals connected to the other side of said parallelly connected circuits.

21. An electric circuit comprising:
a source of variable electrical pulses;
an electrical energy storage device for storing energy received from the source, said storage device comprising a resistance and more than one parallelly connected capacitive circuit, and said resistance and parallelly connected circuits connected in series across the source with at least one of said parallelly connected circuits comprising a series connected resistance-capacitance storage unit;
means for connecting said source to said storage device, said means for connecting comprising a sensing device for passing to said storage device only energy exceeding a predetermined voltage whereby said storage device stores electrical energy at a rate varying as a function of the duration and level of energy passed by said sensing device;
means for discharging said storage device when the source is less than a predetermined voltage; and
two output terminals with one of said output terminals connected to one side of said parallelly connected circuits and the other of said output terminals connected to the other side of said parallelly connected circuits.

22. An electric circuit comprising:
a source of electrical energy;
an energy storage device comprising a first series connected resistance-capacitance circuit connected across the source and a second series connected resistance-capacitance circuit connected across the capacitance of the first series circuit, and a transistor switching circuit connected between the source and the storage device and responsive to the energy level of the source for connecting the source to the storage device only when said electrical energy exceeds a predetermined level; and
two output terminals with one of said output terminals connected to one side of said parallelly connected circuits and the other of said output terminals connected to the other side of said parallelly connected circuits.

23. An electric circuit comprising a source of electrical energy, an energy storage device comprising a first series connected resistance-capacitance circuit connected across the source and a second series connected resistance-capacitance circuit connected across the capacitance of the first series circuit, a transistor switching circuit connected between the source and the storage device and responsive to the energy level of the source for connecting the source to the storage device only when said electrical energy exceeds a predetermined level, and a transistor switching circuit connected across the second series connected circuit and responsive to the energy level of the source for discharging the storage device when said energy is less than a predetermined level.

24. An electric circuit comprising:
a source of electrical energy;
a first series connected resistance-capacitance circuit connected across the source and a second series connected resistance-capacitance circuit connected across the capacitance of the first series circuit; and
a discharge circuit connected in parallel with the resistance of the second series circuit, said discharge circuit having a low resistance in the direction of discharge of the capacitance of the second series circuit.

25. A circuit according to claim 24 wherein said discharge circuit comprises a diode connected in parallel with the resistance of the second series circuit, said diode connected to be conductive in the direction of discharge of the capacitance of the second series circuit.

26. An electric circuit comprising:
a source of electrical energy;
a first series connected resistance-capacitance circuit connected across the source; and
a plurality of series connected resistance-capacitance circuits each having a different time constant connected in parallel across the capacitance of the first series connected circuit, each of said parallelly connected circuits having a discharge circuit connected in parallel with each respective resistance of each parallelly connected circuit, and said discharge circuits each conductive only in the direction of discharge of the capacitances to each form a series connected resistance-capacitance circuit with each capacitance having a low time constant in the direction of discharge.

27. A circuit according to claim 26 also comprising means for shorting across said parallelly connected circuits when the energy of the source is less than a predetermined level.

28. In a protective relay assembly, a pair of terminals, a first capacitor, first circuit means connecting the capacitor for energization by direct current in dependence on the energization of said terminals, said circuit means including substantial resistance, said circuit means and capacitor constituting a first time delay circuit, a second capacitor, second circuit means connecting the second capacitor for energization by direct current in dependence on the voltage across said first capacitor, said second circuit means including substantial resistance, said second circuit means and second capacitor constituting a second time delay circuit, and translating means responsive to the voltage across said second capacitor.

References Cited

UNITED STATES PATENTS

| | | | |
|---|---|---|---|
| 2,467,476 | 4/1949 | Hallmark | 328—39 |
| 2,764,678 | 9/1956 | Craib | 328—67 |
| 2,858,456 | 10/1958 | Royer et al. | 307—88.5 |
| 2,897,380 | 6/1959 | Netzert | 307—88.5 |
| 2,924,724 | 2/1960 | Booker | 307—88.5 |
| 2,999,208 | 9/1961 | Ruehlemann | 328—78 |
| 3,043,222 | 7/1962 | Kaspaul | 328—78 |

JOHN W. HUCKERT, *Primary Examiner.*

J. D. CRAIG, *Assistant Examiner.*